United States Patent

Gallery et al.

[11] Patent Number: 6,034,692
[45] Date of Patent: Mar. 7, 2000

[54] VIRTUAL ENVIRONMENT NAVIGATION

[75] Inventors: Richard D. Gallery, Horley; Dale R. Heron, Crawley, both of United Kingdom

[73] Assignee: U.S. Philips Corporation, New York, N.Y.

[21] Appl. No.: 08/904,388

[22] Filed: Aug. 1, 1997

[30] Foreign Application Priority Data

Aug. 1, 1996 [GB] United Kingdom ................ 96161849

[51] Int. Cl.[7] .................................................. G06T 15/70
[52] U.S. Cl. ...................... 345/427; 345/474; 345/952; 345/957
[58] Field of Search ..................... 345/427, 473, 345/474, 957, 952, 475; 364/578; 395/51

[56] References Cited

U.S. PATENT DOCUMENTS

| 4,821,220 | 4/1989 | Duisberg | 345/473 |
| 5,418,887 | 5/1995 | Connah et al. | 395/51 |
| 5,485,600 | 1/1996 | Joseph et al. | 345/473 |
| 5,608,850 | 3/1997 | Robertson | 345/427 |
| 5,768,161 | 6/1998 | Wavish | 364/578 |

FOREIGN PATENT DOCUMENTS

WO9527952  10/1995  WIPO.

OTHER PUBLICATIONS

"Pengi: An Implementation of a Theory of Activity" by Philips E. Agre and David Chapman of MIT Al Laboratories. Proc. 6th Nat'l. Conf. on Al, pub. Morgan Kaufmann 1987, pp. 268–272.

"Situated Agents Can Have Goals" by P. Maes, from "Designing Autonomous Agents" ed P. Maes, Bradford–MIT Press 1990, pp. 49–70.

*Primary Examiner*—Mark K. Zimmerman
*Assistant Examiner*—Kimbinh T. Nguyen
*Attorney, Agent, or Firm*—Gregory L. Thorne

[57] ABSTRACT

An interactive entertainment apparatus is provided having means (10,14) for modelling a virtual environment populated by modelled characters, with each of the characters being controlled by respective rule-based agents. A camera control function (58) within the apparatus processor periodically monitors at least one compiled behavior per character agent, together with the respective locations within the virtual environment for each of the characters. The processor (10) generates clusters of adjacent characters within the virtual environment in accordance with predetermined clustering criteria such as relatively proximity and commonality of behavioral characteristics, and generates a respective cluster value derived from the current settings of the monitored behaviors within that cluster. In operation, one cluster is selected in dependence on the derived cluster values and, following determination of the location of that cluster within the virtual environment, the viewpoint from which the image of the virtual environment is rendered is shifted to a further viewpoint overlooking the selected cluster.

9 Claims, 4 Drawing Sheets

| ROOM | A | B | C | D | E | F |
|---|---|---|---|---|---|---|
| $I_a=2$ | – | 1 | – | – | – | – |
| $I_a=1$ | 3 | – | – | – | – | 1 |
| $I_a=0$ | – | – | 2 | 3 | – | – |
| $I_a=-1$ | 2 | – | – | – | – | – |
| $I_a=-2$ | 1 | 1 | – | – | 2 | – |
| $I_c.1$ | -1 | 0 | 0 | 0 | -4 | 1 |
| $I_c.2$ | 7 | 4 | 0 | 0 | 4 | 1 |
| $I_c.3$ | 3 | 2 | 0 | 0 | 0 | 1 |
| $I_c.4$ | -4 | -2 | 0 | 0 | -4 | 0 |
| $I_c.5$ | 3 | 4 | 0 | 0 | 0 | 0 |

FIG. 3

VIRTUAL ENVIRONMENT NAVIGATION

The present invention relates to interactive entertainment systems such as immersive games and virtual reality systems which provide the user or users with a view of a virtual world within which computer-generated characters appear and interact with each other and with the users virtual presence. In particular, the present invention relates to such systems where some or all of the characters are independently controlled by respective software agents.

An early example of an agent-based methodology for character control is the Pengi program, which used a situated-action approach to play the Pengo arcade game, and is described in "Pengi: An Implementation of a Theory of Activity" by Philip E. Agre and David Chapman of MIT Artificial Intelligence Laboratory, published by Morgan Kaufmann in Proceedings of the 6th National Conference on AI, pp.268–272, 1987. The Pengi program is structured to approach the game as a human player would, reacting to situations as they arise. This approach has been developed further to provide situated agents as described in, for example, "Situated Agents Can Have Goals" by Pattie Maes, from "Designing Autonomous Agents" edited by P. Maes, pages 49–70, Bradford-MIT Press, 1990. The use of situated agents effectively provides operational capability within a character which can, in effect, be "set free" to roam the virtual environment of the game interacting with other agent-directed characters whilst aiming generally toward solution of a set of game goals. This may be further developed as agent-based drama, where the user may have, at most, only a minor effect on actions and instead has a passive role watching the interaction between different agent-based or agent-directed "actors".

As the processing power available to implement such increasingly complex compound agents increases, the size of the virtual world they may be modelled in increases, as does the number of different characters who may simultaneously inhabit the world at any given time. With the virtual worlds reaching a size where only a part can be presented to a viewer at any given time, a need arises for providing the user not only with a means to navigate through the virtual world (by movement of the viewpoint location and/or orientation from which the users view of the virtual environment is rendered), but also an informed means which is capable of identifying where the most interesting areas are or are likely to be. For interest in terms of current or potential character interactions, the problem is that these can generally only be mapped (in terms of both time and their locations within the virtual environment) where a fairly rigid script is applied—the application removing the interest for repeated viewings.

It is accordingly an object of the present invention to provide a means for enabling navigation of a virtual environment with reference to agent-driven characters within that environment but without requiring explicit scripting of the characters actions.

In accordance with a first aspect of the present invention there is provided an interactive entertainment apparatus comprising: a first data store containing data defining a virtual environment; a second data store containing data defining the external appearance of a plurality of characters; a third store holding a population of rules which, when compiled, comprise a plurality of interacting agents governing the actions of respective ones of said characters; and a data processor arranged to access the first, second and third stores and generate an image of the virtual environment and characters therein from a first viewpoint at a predetermined position and orientation within the virtual environment, characterised by:

monitoring means coupled to periodically monitor at least one compiled behaviour per character agent and the respective locations within the virtual environment of each of the characters; cluster generation means coupled with the monitoring means and arranged to generate clusters, each cluster comprising one or a plurality of adjacent characters within the virtual environment, in accordance with a predetermined clustering criteria and to generate a respective cluster value derived from the current setting or settings of the monitored behaviours within that cluster; and selection means arranged to select one cluster in dependence on the derived cluster values and determine the location of that cluster within the virtual environment, the data processor being arranged to move the position and orientation from the first viewpoint to a further viewpoint overlooking the cluster.

In effect, the "camera" provided by moving the viewpoint from which the image is rendered follows the highest derived interest value for a generated cluster of characters. Various methods for derivation of the interest values, formation of the clusters, and control of the camera motion are described hereinafter.

Further features and advantages of the present invention are defined in the attached claims, to which reference should now be made, and will become apparent from reading of the following description of preferred embodiments of the present invention, given by way of example only, and with reference to the accompanying drawings in which:

FIG. 3 is a table representing individual and cluster interest values from the scenario of FIG. 2.

Figure 1:
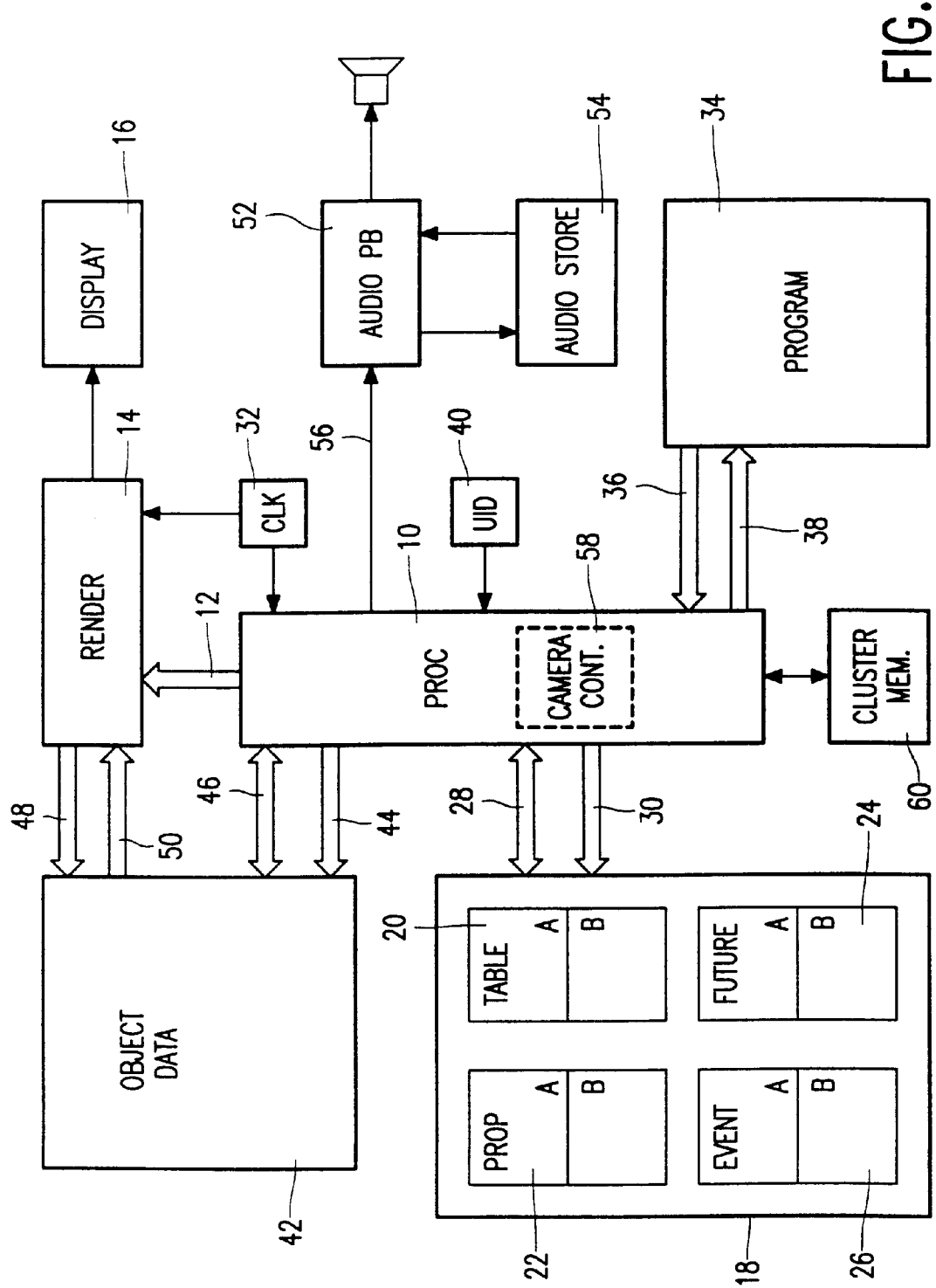
FIG. 1 is a block schematic diagram of a rule-based processing and image rendering apparatus embodying the present invention.

FIG. 1 shows apparatus embodying the present invention providing a virtual environment rendering suite comprising a processor 10 operating on a compiled asynchronous logic circuit representation defined by a population of RTA rules, as will be described. Through control and data link 12, the processor 10 is enabled to control a multi-character interactive animation for which scenes are generated by image rendering stage 14 and output to display 16. A particular command issued to the rendering stage is in the form of a set of virtual environment coordinates generated by a "camera control" function 58 within the processor which coordinates specify the viewpoint direction and location within the virtual environment from which the image is to be rendered. This camera control function 58 determines the viewpoint changes from monitoring of current behaviour settings, as will be described hereinafter.

The processor 10 has associated with it a number of data stores, a first of which is random access memory (RAM) 18 which itself provides a number of discrete storage areas, a first of which 20 holds a table containing details of the various elements of the asynchronous logic circuit representation of the compiled population of RTA rules, with discrete areas of the table holding the details for script agents 20A, which direct the general implementation of the game or drama, and object agents 20B which govern the actions of each of the characters modelled within the virtual environment, and are periodically monitored by the camera control function of processor 10. The compilation of RTA rules to an asynchronous logic circuit representation is described in greater detail in our European patent application EP-A-0704077 (PHB 33903) the disclosure of which is incorporated herein by reference.

Each of the behaviours (register elements), time annotations (delay elements) logic function elements and rules forming the asynchronous logic circuit representation has a row in the table 20. Each row in the table identifies the element number, a state flag of the device, a queued status flag of the device, the internal status, and a propagate function start address in known manner. When the state of the element to which the row of the table relates changes (referred to herein as an event), a propagate function is executed to effect any appropriate changes to all of the elements which may be affected by such a change. These propagate functions are conveniently arranged at certain memory locations or start addresses within another area 22 of the RAM 18. The RAM also provides discrete storage areas for future element state changes 24 and an event stack 26. These features perform their conventional functions although, as with the table 20, each of the memory areas 22, 24, 26 is divided into discrete areas for the script agents and object agents. The RAM 18 is connected to the processor 10 by a data bus 28 and an address bus 30 in known manner. Also in known manner, a clock (CLK) 32 is connected to the processor and, as shown, the rendering stage 14.

A read-only memory (ROM) 34 is coupled to the processor 10 by a data bus 36 and address bus 38 and provides a program store holding a command structure governing implementation of the compiled circuit representation for each of the agents, whether script or object. The processor 10 operates on the circuit representation as directed by the command structure, with propagation through the circuit equating to responding to the satisfaction of condition behaviours by generating one or more further behaviours defining the associated response for the various rule populations embodied by the circuit representation. A user interface device (UID) 40 is provided to enable input of control data and commands directly to the processor 10; the form of the UID will depend on what is required by the application, and may range from one or two simple buttons to keyboard/mouse input in conjunction with a graphical user interface on display 16 and generated by the rendering stage 14.

The use of the form of a rule-based system embodying the present invention addresses the problem of how to monitor the most "interesting" or "potentially interesting" areas of the virtual environment during the interaction of the rule-controlled characters in that environment, for example during a game. Data defining the layout and appearance of a virtual environment is held in a further RAM 42 together with data defining the appearance and current position within the virtual environment of various objects ("props" such as tables, chairs, books, etc.) and each of the virtual actors. It should be noted that the props may comprise simple agents in order to enhance the available forms of interactivity. The processor 10 has read/write access to the RAM 42 via address 44 and data 46 buses, whilst the rendering stage 14 has read-only access via respective address 48 and data 50 buses. Audio accompaniment to the images of the virtual environment may be provided by an audio playback stage 52 which accesses data from a respective audio data store 54 and is under the direction of the processor 10 through control line 56.

Autonomous agents, such as those generated using the RTA agent programming language developed at Philips Research Laboratories, Redhill, UK, typically have states visible to the application programmer, which might well reflect, for example, how "happy" or "sad" an animated character playing a game is. These states are internal to the character agent and the analogy to various human emotions is in terms of the similar effects they have on the characters external actions and performance. For example, the "happy" character may be faster or more ready to interact with other characters than a "sad" character: the reaction to virtual environment stimuli would be faster for an "alert" character than a "bored" one.

In order to determine camera (rendering viewpoint) location, a measure of interest value $l_a$, or vector, can initially be generated for each agent based upon a function measuring current settings of its internal states governing these "emotional" factors, as they appear in Table 20 of RAM 18.

In order to identify points of interest to which the camera is to be directed, the agents in the virtual environment are clustered into groups of one or more agents and a derivation of interest per cluster $l_c$ is made using this measured agent interest value $l_a$. This clustering is done (at least partially) based upon the relative proximity of the characters in the virtual environment. A comparison of the internal states may also be used to give groups of agents interest levels in common behaviour types, or simply to determine whether any fixed specifications existed (such as an indication that certain agent characters were members of a common family or team). Additionally, or as an alternative, the measure of interest might instead be generated for clusters of agents, and a value $l_c$ generated for each cluster, based upon a function measuring their collective internal states. Referring back to FIG. 1, a further storage area 60 is preferably provided for holding current cluster identifications including the respective locations and cluster interest values.

In order to cluster the agents, any of a number of known clustering techniques may be used. For camera control, it is important that the clusters be temporally consistent, with a cluster interest level remaining constant or changing slowly, so that the camera does not jitter. A scheme that will allow this is described below.

Beginning with a situation where there are no clusters, then for each agent that has not been assigned to a cluster, a new cluster is generated. Next is an evaluation of what agents are within a clustering radius of this cluster "seed" agent; unless excluded by other conditions, these further agents are assigned to the same cluster. The clustering radius, and the measure of whether an agent is within it, can be a measure based upon distance within the virtual environment, and also other attributes of the agent (e.g what family or team they are a part of, what their individual interest value $l_a$ is). This allows, for example, clusters of angry agents, which may coincide with a cluster of happy agents in space. The assignment process may be allowed to grow, so that for each agent just assigned to a cluster, that agent is used as a further point from which to measure the cluster radius to determine assignment to the same cluster. Additionally, it may be that we find it convenient to allow some agents to belong to more than one cluster, in which case there could be a limit set on how many clusters an agent could belong to. Some limitation will need to be placed on overall cluster size from the point of view of camera control: where there is a limit to the area of the virtual environment (and characters therein) which can be covered in a single rendering, this maximum area suitably sets the maximum clustering radius. As the radius falls below the maximum value, the camera suitably zooms in (moving the viewpoint toward the agent characters) maintaining a vision field width of the order of twice the radius of the cluster being watched.

In the situation that there are already clusters of agents, then periodically, for each cluster and in order to ensure temporal continuity, each agent that was previously in the cluster should be evaluated to see if it should still belong to the cluster. Additionally, the cluster can examine agents not assigned to it to see if they should be added. For example, if we had a group of ant agents collecting food from a picnic basket, ants would continuously leave and join the cluster centered at the picnic basket, but the cluster itself would still exist, and in the same place. If any agents are unassigned at the end of the evaluation of pre-existing clusters, then the system will attempt to generate new clusters as above.

For camera control, the list of clusters is now available, together with various interest measures, in cluster memory 60. The camera control asserted by the processor function could be as simple as, "always point at the most interesting cluster" but it is important to ensure smooth panning between clusters. A more complex control mechanism might involve using a further agent, this time in the role of cameraman, and itself deciding what to watch. There might be a "fly through" mode, where all interesting clusters were visited periodically. Picture in picture might be used to present all, or several, points of interest at once.

Figure 2:
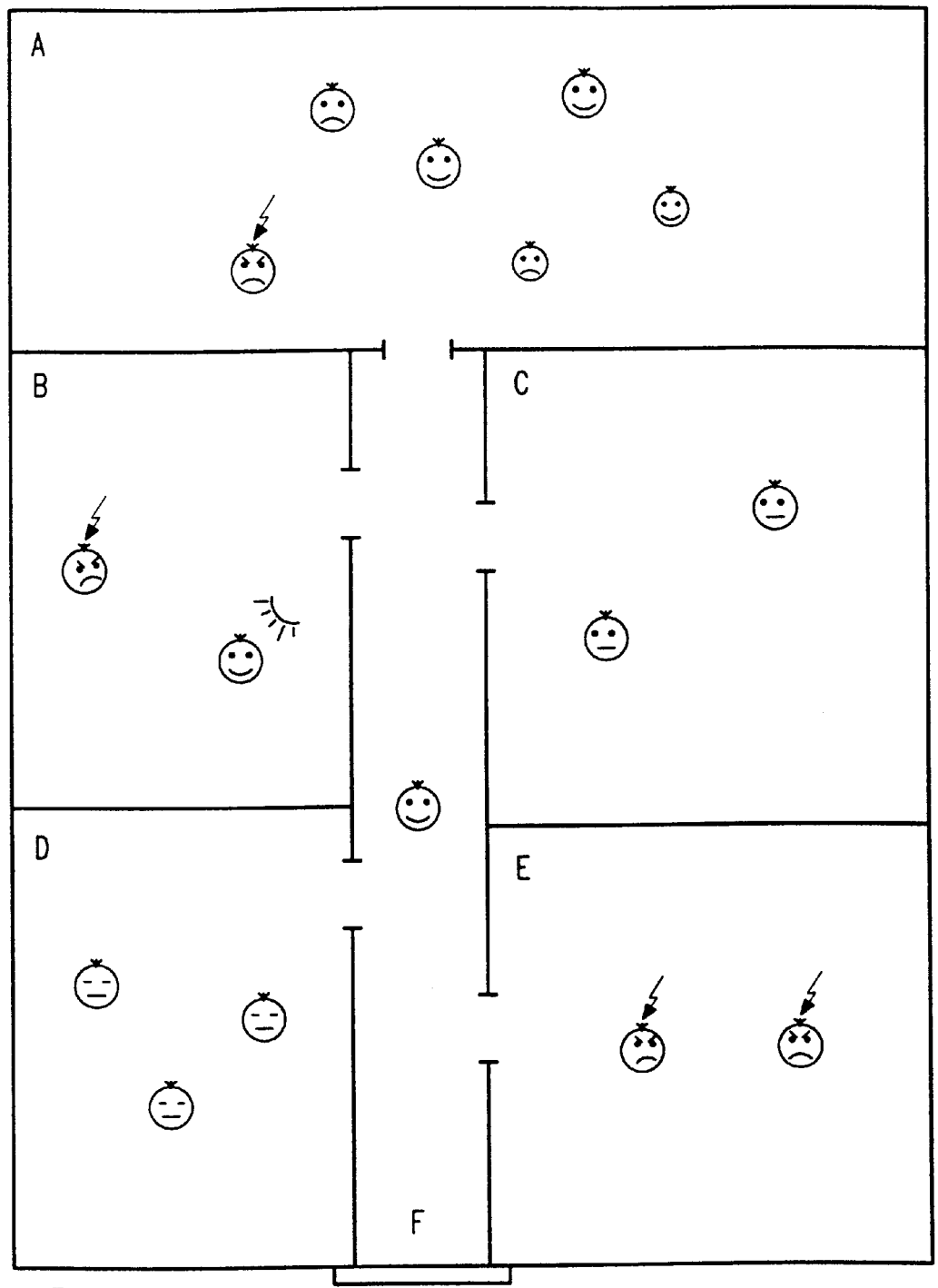
FIG. 2 is a schematic representation of multiple agent-driven characters in a large-area virtual environment.

FIG. 2 is an example application for the agent-state directed camera. In the example, the virtual environment is in the form of a building having five rooms A to E linked by a corridor F: all of the rooms are open and all of the agent-driven characters are free to move from room to room (it is assumed that all characters have at least rudimentary navigation skills in addition to skills for interacting with other agents). The camera can only show the interior of a single room or the corridor at any given time so the agent-state direction is used to provide a guide.

In this case, the initial clusters are by proximity using the boundaries of the room as the clustering radius, and only a single internal agent state, governing temperament, is monitored here. The state has five levels, from very happy, through happy, calm, and sad, to angry to which states simple integer agent interest values $l_a$=2, 1, 0, −1, −2 respectively are assigned: the key at the bottom of the Figure identifies the different character moods by their $l_a$. It will be seen that a sixth agent type is shown, in room D. These agents are "asleep" (and assigned $l_a$=0): when woken they will have individual interest values, which may be carried over from before they slept or may be asserted as a result of being woken. The table of FIG. 3 shows the distribution of agent interest values la with a number of different derivations of cluster interest value $l_c$ which may be used to select the room of interest.

The first cluster interest value $l_c$.1 is formed as a simple sum of the individual agent values for the room cluster. This flags up where the greatest temperament bias lies, although this may not identify the most interesting (to the viewer) room cluster. The greatest negative (and overall) bias is in room E, but if the two characters in room E are angry about the same thing rather than each other, there may be little worthwhile interaction to view. Likewise, the greatest positive bias is in the corridor F, but this is only a single (happy) character wandering about which again is unlikely to be interesting to watch.

The second cluster interest value $l_c$.2 sums the magnitude of the individual agent values and flags up where the greatest 'amount' of temperament lies. Room A is clearly the most interesting according to this measure, despite the previously derived cluster value $l_c$.1=−1, due to the almost balanced distribution of happy and unhappy characters.

The third and fourth cluster values $l_c$.3 and $l_c$.4 respectively sum just the happy (positive) or just the unhappy (negative) values of a cluster. In the case of $l_c$.4, the results are equal for rooms A and E and one or more "tiebreak" conditions will need to be tested if the camera is to automatically select one of the rooms. The tiebreak might be settled by applying one or more of the other cluster interest value evaluation techniques, or by considering a further cluster interest value evaluated in parallel for a further category of agent state (such as a range from tiredness to alertness), or by simpler means such as which of the two rooms contains the greater number of agents. Alternatively, the camera may decline to move if already in one of the candidate rooms or, if not, it may simply select the nearer of the two.

The final cluster interest value $l_c$.5 is evaluated as a spread between the highest and lowest individual values, possibly indicating the most likely location for conflict or dramatic interaction. Unlike previous cluster values, $l_c$.5 flags room B as the most interesting location.

It will be noted that none of these schemes for evaluating $l_c$ has flagged rooms C or D, but it is relatively clear that little of interest would be likely to occur in these rooms with the present occupants current temperament settings. Nevertheless, these rooms might be selected when different criteria (agent states) form the basis for the $l_a$ and $l_c$ evaluation.

Figure 4:
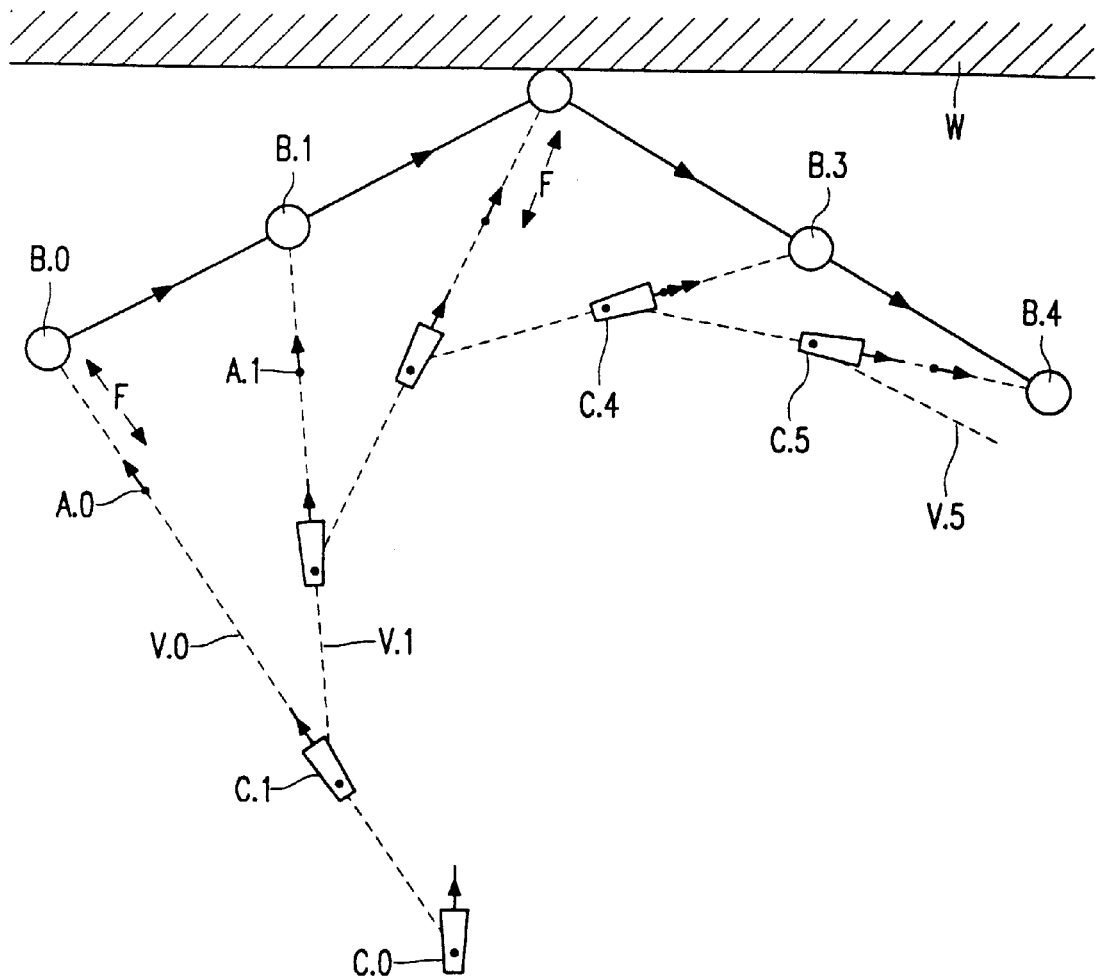
FIG. 4 represents the motion of a virtual camera when following a selected character.

A suitable technique for moving the camera relative to a selected cluster is shown in FIG. 4. As mentioned above, a cluster may be formed from as little as one character: in the example the camera C tracks the movement of a ball B bouncing against a wall W: note that the arrow extending from C indicates the view direction of the camera.

At a first (resting) position and orientation C.0, the camera is instructed to track the ball, at that point at B.0. A vector V.0 is generated from C.0 to B.0; the camera turns to align with the vector and commences to move along it at a constant velocity toward an aim point A.0 a fixed distance F from B.0 along the vector. When the ball reaches point B.1, a fresh vector is drawn to it from the location of the camera C.1 at that instant. Once again, an aim point A.1 is generated at the fixed distance F from the ball, and the camera turns and starts to move toward it along the new vector V.1. The technique is repeated on a regular basis to generate a path for the camera: as will be recognised, the more frequent recalculation of the vector, the smoother will be the motion as the camera orientation changes. An interpolation mechanism may also be provided to give additional smoothing as the camera turns from one aim point to another.

In a preferred implementation, the camera is never allowed to get closer to the ball than the location of the aim point. This ensures that there will be some smoothing through all turns as well as preventing the ball from obscuring too much of the scene. Additionally, rather than having a constant velocity for movement along a vector, the velocity may be derived as a function of the separation between the camera and aim point. This gives a more naturalistic look to the resulting image, with the camera motion slowing as the target is approached.

In order to avoid the generated image becoming static when the tracked cluster is stationary, a constraint on the camera of a minimum velocity of greater than zero would result in the camera slowly circling any stationary cluster.

Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention. The applicants hereby give notice that new claims may be formulated to such features and/or combinations of such features during prosecution of the present application or of any further application derived therefrom.

We claim:

1. Interactive entertainment apparatus comprising: a first data store containing data defining a virtual environment; a second data store containing data defining the external appearance of a plurality of characters; a third store holding a population of rules which, when compiled, comprise a plurality of interacting agents governing the actions of respective ones of said characters; and a data processor arranged to access the first, second and third stores and generate an image of the virtual environment and characters therein from a first viewpoint at a predetermined position and orientation within the virtual environment, characterised by:

monitoring means coupled to periodically monitor at least one compiled behaviour per character agent and the respective locations within the virtual environment of each of the characters;

cluster generation means coupled with the monitoring means and arranged to generate clusters, each cluster comprising one or a plurality of adjacent characters within the virtual environment, in accordance with a predetermined clustering criteria and to generate a respective cluster value derived from the current setting or settings of the monitored behaviours within that cluster; and selection means arranged to select one cluster in dependence on the derived cluster values and determine the location of that cluster within the virtual environment, the data processor being arranged to move the position and orientation from the first viewpoint to a further viewpoint overlooking the cluster.

2. Apparatus as claimed in claim 1, wherein the cluster generation means is coupled to receive data defining relative locations of each character within the virtual environment, and the said predetermined clustering criteria is proximity of candidate characters within the virtual environment.

3. Apparatus as claimed in claim 2, wherein the cluster generation means is operable to apply further criteria to candidate characters in terms of their respective agent behaviour settings, and exclude from the cluster those failing to satisfy the criteria.

4. Apparatus as claimed in claim 1, wherein the data processor is arranged to generate the said image from a viewpoint giving a field of vision of substantially twice the size of the radius of the cluster toward which the viewpoint orientation is directed.

5. Apparatus as claimed in claim 1, wherein the data processor is arranged to determine if a selected cluster is stationary and, if so, to rotate the viewpoint position about the cluster location whilst maintaining an orientation overlooking the cluster.

6. Apparatus as claimed in claim 1, wherein the data processor is arranged to move the position and orientation of the viewpoint by periodically generating a vector from a current viewpoint position to a current cluster location, aligning the viewpoint direction with the vector, and moving the viewpoint location along the vector.

7. Apparatus as claimed in claim 6, wherein the rate of viewpoint position movement along a vector is constant.

8. Apparatus as claimed in claim 6, wherein an aim point is specified on each vector and at a fixed distance from the cluster location, the movement of the viewpoint position along the vector being terminated if the aim point is reached.

9. Apparatus as claimed in claim 8, wherein the rate of viewpoint position movement along a vector is determined by the separation of viewpoint and air point when the vector is generated.

* * * * *